United States Patent Office 3,169,953
Patented Feb. 16, 1965

3,169,953
WATER-SOLUBLE AZO DYESTUFFS
Raymond Gunst, Binningen, Switzerland, assignor to Ciba Corporation, a corporation of Delaware
No Drawing. Filed Aug. 8, 1961, Ser. No. 130,007
Claims priority, application Switzerland, Aug. 18, 1960, 9,350/60
7 Claims. (Cl. 260—153)

U.S. Patent 2,945,022, granted July 12, 1960, to Alfred Fasciati et al. describes and claims azo-dyestuffs containing at least two substituents imparting water-solubility selected from sulfonic or carboxylic acid groups, which correspond to the formula

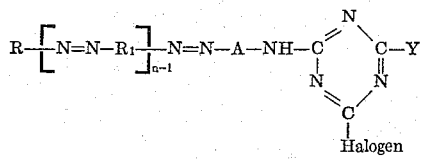

in which R indicates a radical of a diazo component containing carboxyl or sulfonic acid groups as single substituents, $R_1$ is a naphthalene or benzene radical, $n$ is a whole number which is either 1 or 2, Y an —$NH_2$— group or the radical of an amine containing at most 12 carbon atoms, and also having a carboxylic acid or sulfonic acid group if it contains an aromatic ring, and A stands for a benzene radical attached to the azo group in p-position to the —NH— group; and also a process for the manufacture of the aforesaid dyestuffs.

The present invention provides as particularly valuable dyestuffs, water-soluble azo-dyestuffs of the formula (1)
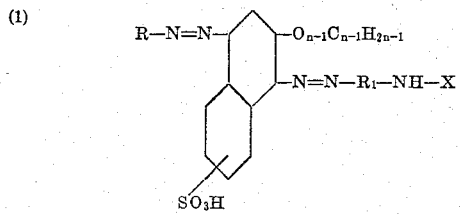

in which R represents a naphthalene radical containing three sulfonic acid groups, $R_1$ represents a benzene radical bound to the azo linkage in para-position to the —NH— group, $n$ is the whole number 1 or 2 and X represents a reactive acyl radical. As reactive acyl radicals there are to be understood acyl radicals which enable dyestuffs containing them to be fixed chemically on cellulose.

Suitable reactive acyl radicals X are, for example, acyl radical of $\alpha:\beta$-unsaturated aliphatic carboxylic acids, such as the acrylyl radical, the $\alpha$-chloracrylyl radical or the radical of the formula

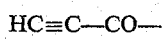

or

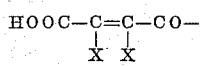

(in which one X stands for hydrogen and the other for chlorine), and preferably radicals containing mobile halogen atoms. In the latter radicals the mobile halogen atom, that is to say, a halogen atom capable of reacting with fibrous materials in the presence of an alkali, may be bound to a heterocyclic radical containing two to three nitrogen atoms, for example, in a pyrimidine radical, or it may be bound to an acyl radical derived from an acid containing at least one acid group of the constitution

for example, to an acyl group derived from cyanuric acid or an aliphatic carboxylic acid. In the case of the acyl radical derived from cyanuric acid the dyestuffs contain at least one halogen atom bound to a 1:3:5-triazine ring, for example, a dichlorotriazine radical or a monochlorotriazine radical, such as radicals of the formula

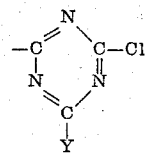

in which Y represents an unsubstituted or substituted amino group or a substituted hydroxyl group or thiogroup. The halogen-containing acyl radicals derived from aliphatic carboxylic acids advantageously contain few, for example, 2 to 3, carbon atoms. As examples there may be mentioned the chloracetyl, $\alpha$-chlorpropionyl, $\beta$-chloropropionyl and the $\alpha:\beta$-dichloropropionyl radical.

The dyestuffs of the above Formula 1 can be made by methods in themselves known from appropriate dyestuffs of the formula (2)
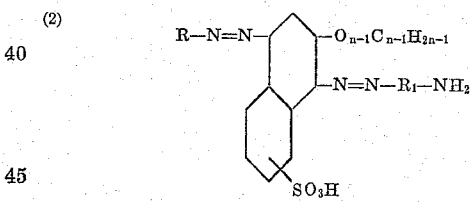

in which R and $n$ have the meanings given with reference to Formula 1, and $R_1$ represents a benzene radical bound to the azo linkage in para-position to the —$NH_2$— group, for example, by the acylation of such a dyestuff with an anhydride or a halide of an acid whose acyl radical is capable of reacting with fibrous materials to form a chemical bond.

As such anhydrides and halides of acids having a reactive acyl radical, there may be mentioned, for example, the anhydrides and halides of $\alpha:\beta$-unsaturated aliphatic carboxylic acids such, for example, as chloromaleic anhydride propiolic acid chloride, acrylic acid chloride, and more especially the halides of aliphatic carboxylic acids containing mobile halogen atoms, such as chloracetyl chloride, sulfochloracetyl chloride, $\beta$-bromo- or $\beta$-chloro-propionyl chloride, $\alpha$-$\beta$-dichloropropionyl chloride; and also trichloropyrimidine (barbituric acid chloride), tetrachloropyrimidine, dichloropyrimidine carboxylic or sulfonic acid chloride, and above all cyanuric chloride or the primary condensation products of cyanuric chloride that contain two chlorine atoms and, instead of the third chlorine atom, a free amino group or an organic radical. Such primary condensation products of 1 molecular proportion of cyanuric chloride and 1 molecular proportion of a reactive organic mercapto- or hydroxy-compound (for example, 1 mol of a phenol or alcohol), 1 mol of ammonia or 1 mol of an organic amine which may or may not have the character of a dyestuff (for example, methylamine, isopropylamine, cyclohexylamine, phenylamine, dimethylamine, ethylamine, ethanolamine, N-methylphenylamine, γ-methoxypropylamine, morpholine, aminoethane sulfonic acid, aminoacetic acid, ortho-, meta- or para-aminobenzoic acid, aminobenzene sulfonic acids, such as aminohenol sulfonic acids, ortho-, meta- or para-aminobenzene sulfonic acid and 1-aminobenzene-2:5 disulfonic acid, aminonaphthalene sulfonic acids, for example, 2-aminonaphthalene - 4:8 - disulfonic acid; and also mercapto-compounds, such as mercaptobenzthiazole, mercaptoacetic acid and the like) can be prepared by known methods. Alternatively, for example, 2:4:6-tribromo-1:3:5-triazine or 2:4:6-trichloro 1:3:5-triazine may be reacted, on one hand, with a dyestuff of the Formula 2 to form a dihalogen-triazine condensation product and, on the other, with ammonia or an organic mercapto- or hydroxy-compound or an organic primary or secondary monoamine to form a monohalogen-triazine condensation product.

The condensation and acylation are advantageously carried out in the presence of an acid-binding agent, such as sodium carbonate or sodium hydroxide, and under conditions such that the final product still contains one or two mobile halogen atoms, that is to say, for example, in an organic solvent or at a relatively low temperature in an aqueous-organic or aqueous medium.

The acylatable parent dyestuffs of the Formula 2 can be prepared by coupling aniline or an aniline derivative, more especially, for example, cresidine, anisidine, a 3-acylamino - 1 - aminobenzene, meta-toluidine or 1:4-dimethyl-2-aminobenzene, with a diazo-compound of a dyestuff of the formula (3)
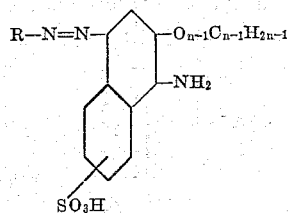

The monoazo-dyestuffs of the Formula 3 can be prepared by coupling a diazotized 1- or 2-aminonaphthalene trisulfonic acid, such as 1-naphthylamine-2:4:7-, -2:4:8-, -2:5:7-, -3:6:8- or -4:6:8-trisulfonic acid or 2-naphthylamine-1:3:7-, -1:5:7-, -3:5:7-, -4:6:8- or -3:6:8-trisulfonic acid, with 2-methoxy-1-aminonaphthalene-6-sulfonic acid, and above all with 1-aminonaphthalene-6-sulfonic acid and 1-aminonaphthalene-7-sulfonic acid or with 1-aminonaphthalene-8-monosulfonic acid in an acid medium.

The diazotization of the aforesaid amino-monoazo-dyestuffs of the Formula 3 used for making the dyestuffs of the Formula 2 can be carried out by methods in themselves known, for example, with the use of a mineral acid, more especially hydrochloric acid, and sodium nitrite. The coupling of the resulting diazo-compounds with the aforesaid aniline derivatives capable of coupling in the 4-position, is likewise carried out by methods in themselves known.

The acylation of the dyestuffs of the Formula 2 is advantageously carried out in the presence of an acid-binding agent, such as sodium acetate or sodium carbonate. The acylation is carried out in manner such that the resulting condensation product still contains a mobile halogen atom or a reactive double bond, for example, in a weakly acidic to neutral medium and/or at as low a temperature as possible.

The dyestuffs so formed are advantageously isolated at as low a temperature as possible by salting out and filtering. The filtered dyestuff may be dried, if desired, with addition of an extender and/or a buffer, such as a mixture of equal parts of monosodium phosphate and disodium phosphate. The drying is advantageously carried out at not too high a temperature under reduced pressure. By spray-drying the whole mixture in which the dyestuff is made it is in some cases possible to obtain the dry preparations of the invention directly, that is to say, without intermediate isolation of the dyestuff.

The dyestuffs of the invention are suitable for dyeing or printing a very wide variety of materials, more especially fibrous cellulosic materials, such as linen, regenerated cellulose and above all cotton. They are especially suitable for the so-called pad dyeing method in which the material is impregnated with an aqueous solution of the dyestuff which may also contain a salt, and then after treatment with an alkali, the dyestuff is fixed in the cold, in the case of dihalogen-triazine dyestuffs, or with the aid of heat, in the case of mono-halogen-triazine dyestuffs. This process and the direct dyeing method, which can also be used with many of the dyestuffs of the invention, produce valuable dyeings that are fixed fast to washing. By printing processes fast prints are obtained.

To improve the wet fastness of the dyeings and prints obtained in this manner, it is of advantage to rinse them thoroughly in cold and hot water, if desired, with the addition of an agent having a dispersing action and capable of assisting the diffusion of any unfixed dyestuff.

The dyeings produced with the new dyestuffs on polyhydroxylated, more especially cellulosic, fibers are in general distinguished by the high stability of the fiber-dyestuff bond, by the ease with which unreacted dyestuff can be washed out, by their good fastness to light and above all by their outstanding fastness to washing.

The following examples illustrate the invention, the parts being by weight:

Example 1

A suspension of 18.6 parts of cyanuric chloride in a mixture of 300 parts of ice and 200 parts of ice water is mixed with a solution of 76.5 parts of the amino-disazo-dyestuff prepared by coupling a diazo-compound of 1-amino-naphthalene-2:5:7-trisulfonic acid with 1-amino-naphthalene-6-sulfonic acid, diazotizing the resulting amino-monoazo-dyestuff and coupling it with 1-amino-2-methoxy-5-methylbenzene in 500 parts of water. During the condensation the temperature is maintained at about 10° C. and the pH value between 5 and 7. After 2 hours, 300 parts of a 2 N-solution of ammonia are added, the mixture is stirred for 4 hours at 40° C., the dyestuff is precipitated, and the reaction mixture is filtered and dried. The resulting dyestuff dyes cotton from an alkaline dyebath reddish brown tints which are fast to washing and light.

By the same method there are obtained dyestuffs which produce dyeings having the tints given in column V of the following table by condensing cyanuric chloride in any desired order of succession, on the one hand, with the amino-compounds given in column IV and, on the other, with the disazo-dyestuffs obtained by coupling the diazotized aminonaphthalene trisulfonic acids given in column I and with aminonaphthalene monosulfonic acids given in column II, followed by coupling the resulting diazotized monoazo-compounds with the benzene derivatives given in column III.

| | I | II | III | IV | V |
|---|---|---|---|---|---|
| 1 | 1-aminonaphthalene-4:6:8-trisulfonic acid. | 1-aminonaphthalene-6-sulfonic acid. | 1-amino-2-methoxy-5-methylbenzene. | Ammonia. | Red-brown. |
| 2 | 2-aminonaphthalene-4:6:8-trisulfonic acid. | ----do---- | ----do---- | ----do---- | Yellowish brown. |
| 3 | 1-aminonaphthalene-2:5:7-trisulfonic acid. | ----do---- | ----do---- | 1-N-methylaminobenzene-4-sulfonic acid. | Red-brown. |
| 4 | ----do---- | ----do---- | ----do---- | 1-N-methylaminobenzene-3-sulfonic acid. | Do. |
| 5 | ----do---- | ----do---- | ----do---- | 1-aminobenzene-3-sulfonic acid. | Do. |
| 6 | ----do---- | ----do---- | 1-amino-3-acetylamino-benzene. | Ammonia. | Yellow-brown. |
| 7 | ----do---- | ----do---- | 1-amino-2:5-di-methylbenzene. | ----do---- | Orange-brown. |
| 8 | ----do---- | 1-aminonaphthalene-7-sulfonic acid. | ----do---- | 1-N-methylaminobenzene-4-sulfonic acid. | Do. |
| 9 | ----do---- | ----do---- | ----do---- | 1-N-methylaminobenzene-3-sulfonic acid. | Do. |
| 10 | ----do---- | ----do---- | ----do---- | 1-aminobenzene-3-sulfonic acid. | Yellow-brown. |
| 11 | ----do---- | 1-aminonaphthalene-8-sulfonic acid. | 1-amino-2-methoxy-5-methylbenzene. | Ammonia. | Red-brown. |
| 12 | ----do---- | ----do---- | ----do---- | Ethanolamine. | Do. |
| 13 | ----do---- | 1-aminonaphthalene-6-sulfonic acid. | 1-amino-2:5-di-methylbenzene. | 1-aminobenzene-3-sulfonic acid. | Yellow-brown. |
| 14 | ----do---- | ----do---- | ----do---- | Ethanolamine. | Do. |

*Example 2*

A solution of 2 parts of the dyestuff prepared as described in the first paragraph of Example 1 in 100 parts of water is used to impregnate a cotton fabric on a padding machine at 60 to 80° C., and the fabric is then squeezed until it retains 75% of its weight of dyestuff solution.

The impregnated fabric is dried and then impregnated at room temperature with a solution containing, per liter, 10 parts of sodium hydroxide and 300 parts of sodium chloride, squeezed to a weight increase of 75%, steamed for 60 seconds at 100 to 101° C., rinsed, treated in a sodium bicarbonate solution of 0.5% strength, rinsed, soaped for 15 minutes at the boil in a solution of 0.3% strength of a non-ionic detergent, and finally dried.

A red-brown dyeing is obtained which is fast to washing and light.

*Example 3*

2 parts of the dyestuff prepared as described in the first paragraph of Example 1 are dissolved by boiling for a short time in 100 parts of water. The resulting stock solution is added to 2900 parts of water at 20° C. 30 parts of trisodium phosphate and 60 parts of sodium chloride are then added, 100 parts of cotton are entered into the dyebath, which is then raised within 45 minutes to 80° C., a further 60 parts of sodium chloride are added, and dyeing is continued for 30 minutes at 90 to 95° C. The dyeing is rinsed, after-treated for 15 minutes at the boil in a solution containing, per liter, 2 grams of sodium carbonate and 3 grams of soap, rinsed and finally dried. A strong red-brown dyeing is obtained.

What is claimed is:
1. A water-soluble dyestuff of the formula

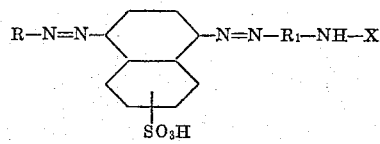

in which R represents trisulfonaphthyl, $R_1$ represents phenylene being substituted by members selected from the group consisting of aliphatic lower acyl amino, lower alkyl and lower alkoxy, and bound to the azo group in para-position to the NH—X group, and X represents monochlorotriazine radical substituted with a member selected from the group consisting of —$NH_2$, lower alkylamino, hydroxy lower alkylamino and sulfophenylamino.

2. A watersoluble dyestuff of the formula

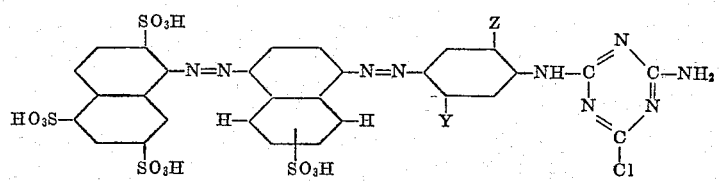

in which Y and Z each represents a member selected from the group consisting of methyl and methoxy.

3. A watersoluble azo dyestuff of the formula

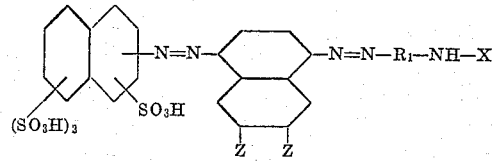

in which one Z represents a hydrogen atom and the other Z a sulfonic acid group, $R_1$ represents a phenylene radical bound to the azo group in para-position to the NH—X group and X represents monochlorotriazine radical substituted with sulfophenylamino.

4. The watersoluble dyestuff of the formula

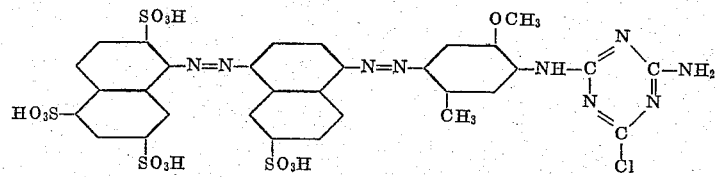

5. The watersoluble dyestuff of the formula
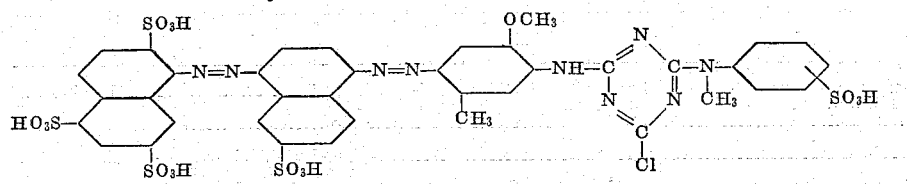
6. The watersoluble dyestuff of the formula
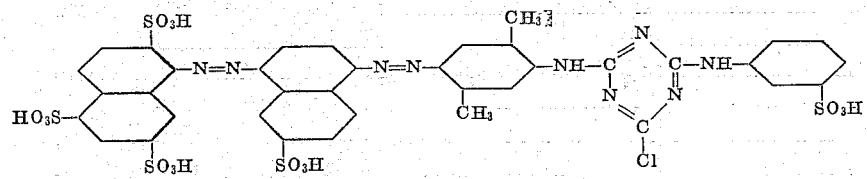
7. The watersoluble dyestuff of the formula
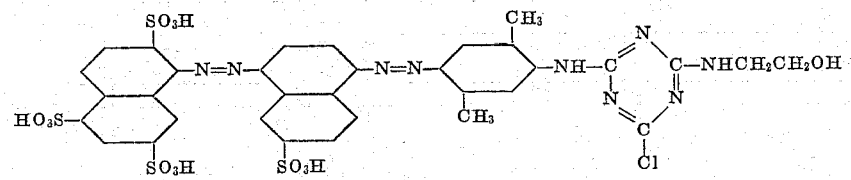
References Cited in the file of this patent
UNITED STATES PATENTS
2,945,022    Fasciati et al. _____ July 12, 1960